3,099,629
POLYMERIC SALTS AND PREPARATION THEREOF

Henry Philip Heubusch, Cheektowaga, N.Y., assignor, by mesne assignments, to Bell Aerospace Corporation, Wheatfield, N.Y., a corporation of Delaware
No Drawing. Filed Oct. 13, 1959, Ser. No. 846,051
14 Claims. (Cl. 260—2)

This invention relates to new and useful energy generants and more particularly to that class of energy generants generally known as solid monopropellants of the single compound type.

There is today a great need for more powerful, stable and generally more easily handled gas generants, particularly for use as propellants in the rocketry field and also for use in improved pyrotechnics and explosives.

At the present stage of development the propellants being used fall broadly into two categories, liquids and solids. The liquids have the advantage of inherent high energy but the disadvantage of being difficult to handle due to high corrosiveness, high toxicity, and extremely high chemical activity. The solid propellants, or gas generants, have for some time been recognized as being more desirable from the standpoint of handling characteristics, being inherently more stable but up to now no solid fuel has been found which approximates the energy levels obtainable by the use of liquid fuels.

Of the solid fuel developments, the most success has been obtained with composite types, which generally comprise a physical mixture of an oxidizing salt and a fuel-binder. However, this method is limited by the fact that the ingredients which lend themselves to this type of formulation are of relatively low energy level and that the optimum energy level of the more powerful of the available ingredients cannot be obtained because the ingredients cannot be satisfactorily combined in the exact proportion which would give maximum energy output.

It will be apparent that there is still a great need for more controllable, safer, and otherwise improved high energy gas generants which combine the respective advantages of the known liquid and solid generants. The advantages gained therefrom will be equally as useful in the explosive and pyrotechnic fields as for propellants.

I have found hydrazine and certain derivatives thereof can be condensed with carbonyls, and with compounds which are polyfunctional, and capable of undergoing a polymerization process, and that before or at an appropriate point during the polymerization process, boron hydrides or derivatives may be chemically combined to available nitrogen atoms to yield high molecular weight polymers containing, integrally bonded within the basic recurring unit of the polymer, the boron hydride moiety. The boron hydrides which are contemplated for use in the present invention are well-known and include pentaborane, decaborane and alkyl derivatives of such compounds. In addition to hydrazine itself and such simple derivatives as hydroxy alkyl substituted hydrazines, and specifically diethylol hydrazine and the cyclic derivative, specifically N-aminoethyleneimine, other hydrazines which may be employed for salt formation with boron hydrides described above are unsaturated derivatives such as allyl hydrazine, vinyl hydrazine and unsymmetrical allyl vinyl hydrazine.

Each of the aforementioned polymers contains a nitrogen atom which is capable before or at an appropriate step during the polymerization process of reacting with a boron hydride to form a stable salt. The type of reaction employed to effect polymerization and the point at which salt formation is effected depend on the particular polymer under consideration.

Hydrazine itself may be reacted with a polybasic acid of the aliphatic or aromatic series, such as oxalic acid, malonic acid and phthalic acid and before or at an appropriate point during this reaction chemically combined with a boron hydride, to form B—N containing polyhydrazides of the corresponding dibasic acid. By varying the polybasic acid used, the ratio of oxidizer to fuel can be changed to fit any specifically desired energy level. Instead of using the polybasic acid itself, it is also possible to employ the anhydride or acid halide thereof. It is also contemplated that instead of the saturated aliphatic polyfunctional acids above described which give rise to thermoplastic polymeric materials, one may employ unsaturated aliphatic polybasic acids of a mixture of saturated and unsaturated acids. The use of the unsaturated acids as described above leads to products which may be cross-linked to yield thermosettable compositions. The use of mixtures of acids gives rise to products of intermediate physical properties.

In addition to the use of a single boron hydride to effect formation of the desired polymeric salt, one may employ a mixture of boron hydrides. Where hydroxyl derivatives of hydrazine are employed in lieu of hydrazine itself, the resulting esters, instead of being B—N containing polyhydrazides or polyazines, are B—N containing polyesters. Where one employs ethylenically unsaturated derivative of hydrazines such as the vinyl or allyl compounds mentioned above, the polymerization occurs in the usual addition manner similar to other vinyl type polymerizations.

As described above, at least one basic, salt-forming amino or imino group is reacted with a maximum of one equivalent of the boron hydride per nitrogen atom resulting in a chemical combination containing sufficient oxidizing potential to convert all of the nitrogen compound to gaseous decomposition products at suitable and selected temperatures and pressures. Upon proper activation as by the use of elevated temperature, the polymeric materials herein contemplated give rise to a tremendous evolution of gaseous products which manifest themselves in the development of high energy levels useful in propellant, pyrotechnic and explosive applications.

The decomposition of the polymeric salts of this invention may be carried out in a reaction motor, gas generator or other energy conversion mechanisms by any suitable means. Thus, the polymer mass may be heated either internally or externally by electrical means or by any indirectly applied heat exchange medium such as steam, hot gas, molten metals and the like. Once the critical decomposition temperature has been reached the reaction is self-sustaining and usually no further heating is necessary.

The following examples will serve to illustrate the present invention without being deemed limitative thereof:

Example 1

The hydrazine derivative, 3-amino-2-oxazolidnone, is heated to 150° C. at atmospheric pressure. Carbon dioxide is evolved and a yellow solid, polyethylene hydrazine is formed. Heating is continued until the polymerization is complete as judged by collecting and measuring the evolved gas. The yellow solid is then suspended in methyl alcohol and to the suspension are added at ambient temperature and with stirring, 1.0 mole of decaborane per mole of polyethylene hydrazine. Stirring at ambient temperature is continued for 18 hours. The product which is formed is isolated by decantation and is purified by washing with ethyl alcohol and methylene chloride. The resulting polymer, polyethylene hydrazine decaborane, is an amorphous yellow solid. Upon heating the solid to 200° C., it decomposes to gaseous products.

Example 2

Hydrazine hydrate and adipic acid are refluxed at a mole ratio of 1:1. A white solid forms. To the suspension is added, with caution, an equimolar amount of decaborane. Refluxing is resumed and continued for four hours. Water is then removed by simple distillation. The pressure is next reduced to less than 1 p.s.i.a. the temperature increased to about 200° C. and distillation continued for eight hours. A rubbery, black polymer results. Upon heating the polymer to 275° C., it decomposes to gaseous products.

*Example 3*

Example 2 is repeated except that malonic acid is used in lieu of adipic acid. Comparable results are obtained.

*Example 4*

To 2.2 moles of hydrazine hydrate is added one mole of maleic anhydride. The resulting solution is refluxed at atmospheric pressure for twenty-four hours yielding a thermoplastic, orange polymer. To this is added one mole of decaborane. The ingredients are refluxed for four hours then subjected to heating under vacuum. Water is driven off and a thermosetting resin results.

*Example 5*

To one mole of unsymmetrical diethanol hydrazine is added one mole of oxalic acid and an excess of distilled water. The ingredients are refluxed for eight hours yielding an orange solution. Water is removed by distillation at 25° C. and 0.2 p.s.i.a. After heating for approximately two hours at 25° C., the temperature is raised and distillation continued for approximately three hours at 100° C. A viscous, red polymeric liquid results. This is removed and dissolved in alcohol. The solution is transferred to a suitable reactor and cooled to 0° C. Pentaborane is bubbled into the solution until more than one equivalent has been added per mole of hydrazine compound. The resulting solution is agitated at room temperature for eight hours. Following this, methylene chloride is added to the vented vessel. A polymeric, orange solid which decomposes at 300° C. separates from solution.

*Example 6*

To one mole of an aqueous solution of unsymmetrical diethanol hydrazine is added one mole of oxalic acid and one mole of decaborane. The ingredients are refluxed at atmospheric pressure for eight hours. The pressure is then reduced below 1 p.s.i.a. and excess water removed by distillation. Further heating at a higher temperature yields a polymeric, yellow solid which decomposes at 280° C.

*Example 7*

To one mole of an aqueous solution of vinyl hydrazine is added one mole of decaborane. The resulting solution is refluxed at atmospheric pressure for eight hours. Water is removed from the resulting solution by vacuum distillation leaving behind a white solid. The temperature is gradually raised to 190° C. while maintaining a pressure less than 1 p.s.i.a. The appearance of the solid gradually changes and after approximately six hours heating results in a red, thermoplastic polymer. A small portion of the polymer is heated to 220° C. and complete decomposition to gaseous products results.

*Example 8*

Example 7 is reapeated except that allyl hydrazine is used in lieu of vinyl hydrazine. Comparable results are obtained.

*Example 9*

Example 7 is repeated except that pentaborane is used in lieu of decaborane and addition is made in alcoholic solution. Comparable results are obtained.

*Example 10*

Example 7 is repeated except that unsymmetrical diallyl hydrazine is used in lieu of vinyl hydrazine. There re-results, similarly, a polymeric substance which is thermoplastic and decomposes at 210° C.

*Example 11*

Example 10 is repeated except that the thermoplastic product is heated for 8 hours at 200° C. causing crosslinking and the production of a black polymeric substance which is thermosetting and decomposes at 290° C.

*Example 12*

One mole of hydrazine and one mole of decaborane are mixed to form a salt. The salt (1 mole) is gently heated under reflux with an excess of formaldehyde and 0.25 mole of hydrochloric acid for four hours. An amorphous product is isolated from the reaction mass. This product upon further heating for three hours at 6 mm. vacuum forms a hard, non-fusible resin. Heating a small portion of the resin to 280° C. results in complete decomposition to gaseous products.

*Example 13*

Example 12 is repeated except that two moles of decaborane are added instead of one. Comparable results are obtained.

In addition to the organic dicarboxylic acids, both aliphatic and aromatic, described in the above examples, it is also possible to employ any of the polycarboxylic acids heretofore employed in the preparation of polyamide, alkyd and polyester type resins. Other aldehydes in addition to formaldehyde may also be used. While the catalysts described are preferred, others well known in the polymerization and condensation arts may be used.

I claim:
1. The polymeric salt of polyethylene hydrazine and decaborane.
2. The polymeric salt of hydrazine hydrate, adipic acid and decaborane.
3. The polymeric salt of hydrazine hydrate, malonic acid and decaborane.
4. The polymeric salt of hydrazine hydrate, maleic anhydride and decaborane.
5. The polymeric salt of unsymmetrical diethanol hydrazine, oxalic acid and pentaborane.
6. The polymeric salt of unsymmetrical diethanol hydrazine, oxalic acid and decarborane.
7. The polymeric salt of vinyl hydrazine and decaborane.
8. The polymeric salt of allyl hydrazine and decaborane.
9. The polymeric salt of vinyl hydrazine and pentaborane.
10. The polymeric salt of unsymmetrical diallyl hydrazine and decaborane.
11. The polymeric salt of hydrazine, formaldehyde and decaborane.
12. The polymeric salt of hydrazine, oxalic acid and decaborane.
13. The polymeric salt of hydrazine, formaldehyde and pentaborane.
14. The polymeric salt of N-aminoethyleneimine and decaborane.

No references cited.